UNITED STATES PATENT OFFICE.

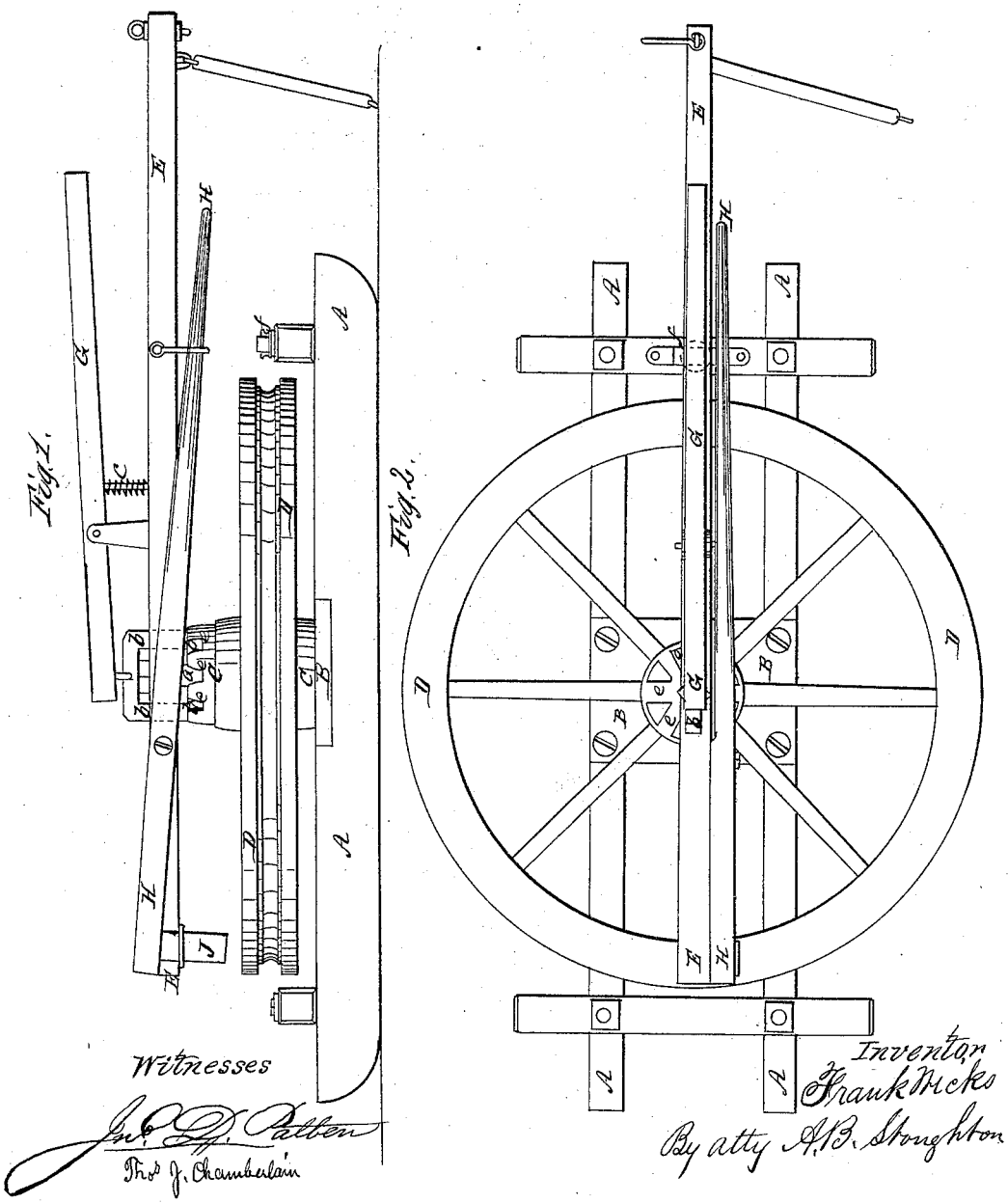

FRANK WICKS, OF UPPER SANDUSKY, OHIO.

IMPROVEMENT IN HORSE-POWER APPARATUS FOR ELEVATING HAY, &c.

Specification forming part of Letters Patent No. 57,608, dated August 28, 1866.

*To all whom it may concern:*

Be it known that I, FRANK WICKS, of Upper Sandusky, in the county of Wyandot and State of Ohio, have invented certain new and useful Improvements in Horse-Power Apparatus for Elevating Hay onto Stacks or into Barns; and I do hereby declare that the following is a full, clear, and exact description of the construction and operation of the same, reference being had to the accompanying drawings, making a part of this specification, in which—

Figure 1 represents an elevation of the machine. Fig. 2 represents a top plan thereof.

The object and purpose of my invention are to provide a proper machine wherein the power of a horse or horses may be used for raising up hay, &c., onto stacks or into barns, and so that the machine may be thrown readily out of action, while the team may continue on in their path or circuit; and my invention consists in combining with the sweep to which the team is hitched a shipper and a brake, so that the attendant at any time may disconnect the power of the team from the hoisting-wheel, while the team may continue on, and further, if he so chooses, may apply the brake to the stopping of the hoisting-wheel, or connect the team and wheel at pleasure, or as the special work may require.

To enable others skilled in the art to make and use my invention, I will proceed to describe the same with reference to the drawings.

In working hoisting apparatus the horse or team, as a general thing, walks off from the load, and when it is raised he must be backed or turned around and walked back for the next succeeding operation. This is tedious to man and horse, and I propose to allow the horse to walk around in a circuit, and connect or disconnect his power to the hoisting apparatus at will, and to stop the hoisting apparatus at will also.

This hoisting apparatus, for convenience, is made portable, so that it may be moved from stack to stack, or from place to place, and for this purpose is set upon a pair of runners, A, on which it can be moved easily. The runners constituting the base of the power-machine, there is arranged in or upon a central portion thereof, as at B, a bearing-block for supporting a spindle, upon or around which the hub C of the rope-wheel D may turn. The top *a* of the spindle or journal is made square, and upon this square portion the sweep E is placed, so that as the sweep goes around the spindle shall go with it; but the rope-wheel D can turn independent of the spindle.

Upon the sweep, as at F, is hung the clutch-lever G, having a U or staple shaped piece of metal, *b*, pendent from one of its ends, which piece *b* is thrown down toward the hub of the rope-wheel D by the reaction of a spring, *c*, and dropping into any pair of the series of notches *e* made in the top of said hub C forms a clutch-connection between the sweep E and the hoisting-wheel D. By pressing down the free or farther end of the clutch-lever G, the sweep and hoisting-wheel are disconnected, and the team can continue to walk around without working the wheel.

If it should become necessary to stop the wheel and team, it can be done by the brake-lever H, which is pivoted to the sweep at I, and has upon its end a brake-block, J, which comes down upon the rim of the hoisting-wheel, and by friction stops it.

The rope or hoisting wheel D is grooved around its perimeter to receive the hoisting-rope, which passes over or around a pulley, *f*, and thence to the derrick or mast by which the hay is elevated and connected to the hay-fork or other thing by which the load is supported.

Having thus fully described the construction and operation of my apparatus, what I claim therein as new, and desire to secure by Letters Patent, is—

In combination with the sweep and hoisting or rope wheel, a clutch and a brake lever operating therewith, substantially in the manner and for the purpose described.

FRANK WICKS.

Witnesses:
   W. J. FRAZIER,
   A. S. WORMLEY.